(No Model.)
E. R. ALLEN.
BICYCLE AND BICYCLE COURSE.
No. 581,501. Patented Apr. 27, 1897.
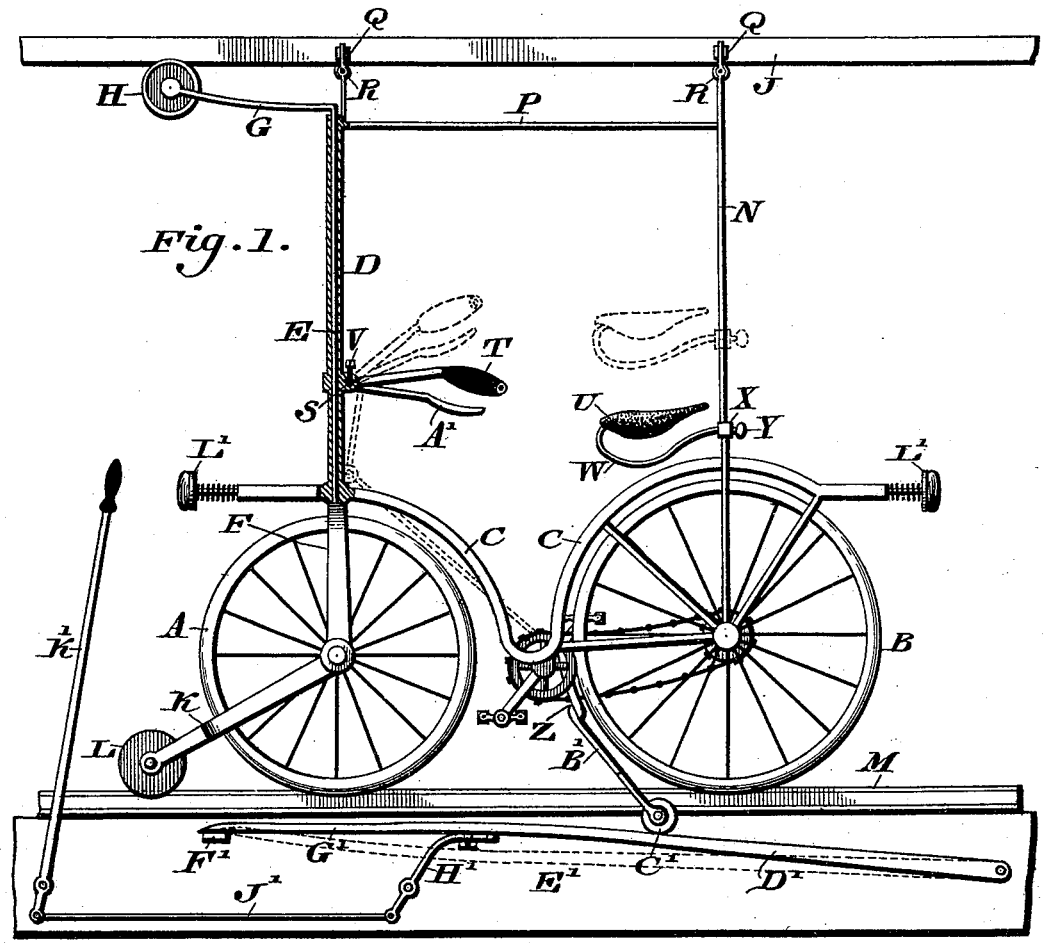
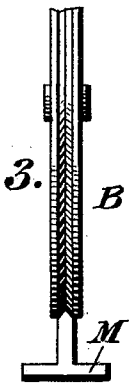
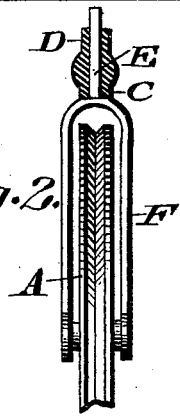
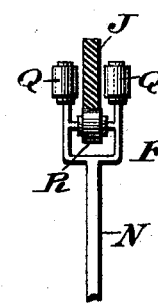
Witnesses
O. F. Eagles.
L. Douville.
Inventor
Edward R. Allen.
By his Attorney

UNITED STATES PATENT OFFICE.

EDWARD R. ALLEN, OF PHILADELPHIA, PENNSYLVANIA, ASSIGNOR TO JOHN W. CALVER, OF SAME PLACE.

BICYCLE AND BICYCLE-COURSE.

SPECIFICATION forming part of Letters Patent No. 581,501, dated April 27, 1897.

Application filed July 25, 1894. Serial No. 518,546. (No model.)

*To all whom it may concern:*

Be it known that I, EDWARD R. ALLEN, a citizen of the United States, residing in the city and county of Philadelphia, State of Pennsylvania, have invented a new and useful Improvement in Bicycles and Bicycle-Courses, which improvement is fully set forth in the following specification and accompanying drawings.

My invention consists of a bicycle which is provided with means for retaining the same in vertical position and guiding the same around a course on which it is adapted to run.

It also consists in providing the bicycle with a vertically-adjustable seat.

It also consists of an automatically-acting brake.

Figure 1 represents a side elevation of a bicycle and bicycle-course or pleasure-railway embodying my invention. Fig. 2 represents a partial front view and partial vertical section of a detached portion. Fig. 3 represents a front view of another detached portion. Fig. 4 represents a partial front view and partial vertical section of another detached portion.

Similar letters of reference indicate corresponding parts in the several figures.

Referring to the drawings, A and B designate the wheels of a bicycle, and C the reach or backbone thereof.

D designates a vertical tube or sleeve which rises from and is connected with the forward part of the reach C and freely receives the rod E, which is connected with the fork F of the front wheel A, said rod having at its upper end the forwardly-projecting arm G, on the end of which is mounted the pilot or guide wheel H, which runs on the elevated track J.

Projecting forwardly from the lower end of the fork F is the arm K, on the end of which is mounted the pilot or guide wheel L, which runs on the track proper, M, it being noticed that the wheels A and B are grooved and run on said track M, whose head is somewhat pointed or V-shaped to accord with the peripheries of the wheels A and B.

Rising from the bearings of the axle of the wheel B and secured thereto is a rod N, which is connected with the sleeve or upright D by means of a cross-bar and brace P, it being noticed that the upper ends of the uprights D N carry the vertically-arranged rollers Q, which are located to run on opposite sides of the track J, and the horizontal rollers R, which are located to run on the under side of said track, it now being seen that the bicycle is nicely sustained in vertical position and prevented from overturning.

As the tracks will be preferably of circular form, the pilots H and L, running on the same in advance of the bicycle proper, will relieve the wheels A and B of considerable friction as they follow the curves of the tracks.

The sleeve D has secured to or formed with it the eye S, on which is pivotally mounted the swinging handles T, which are grasped by the rider for retaining his position on the seat U, it being evident that said handles may be turned on their axis and raised or lowered, so as to be adjusted relatively to the height of the hands of the rider.

In order to retain the handles in the adjusted position, I employ the bolt V, which is fitted in the eye S and adapted to tighten against the pivot or axis of the handles.

The support W of the seat U is provided with the collar X, which is freely fitted on the rod N and adapted to be held thereon by the screw or bolt Y, by which provision the seat may be vertically adjusted relatively to the height of the rider.

The bicycle is provided with a brake Z, which may be operated by the hand-lever A', as usual in bicycles.

It will be noticed that the reach C, with the uprights D and N, form an open frame in which the handle-bars and the seat are located, the same offering no obstruction to said bars and seat.

Depending from the brake or shoe thereof is an inclined arm B', on whose lower end is mounted the roller C', which is adapted to run on the auxiliary rail D', the latter being located adjacent to the track M, it being noticed that one end of said rail is pivoted to a stringer or other support E' and sustained on the other end on the bar F', which is secured to said support, it being noticed that the rail extends in an inclined direction upwardly from its pivotal end toward the main portion G', which is parallel or approximately parallel with the track M.

A crank-arm H' is mounted on the support E' and connected with the rail D' and with a link J', the latter having attached to it the hand-lever K', whereby said rail D' may be raised.

It will be noticed that the rail will be located near the stopping-place or terminal of the track or course, whereby the roller C' will ride upon the same and gradually force the brake or shoe Z against the wheel B, and thus automatically stop or brake the bicycle. Should it, however, be apparent to the attendant that the momentum of the bicycle is too great and that it may pass the free end of the rail D' without stopping, the operator moves the lever K', whereby the portion G' of the rail is raised, and thus additional upward pressure is exerted on the roller C', and consequently on the brake or shoe Z, thus effecting the stopping of the bicycle.

On the ends of the reach C are spring-pressed or yielding buffers L', which project horizontally therefrom, respectively, at the front and rear of the same. By this provision should there be collisions the buffers will break the force of the same and prevent serious injury or accidents, as is evident.

When it is desired for the bicycle to pass the brake-rail D', so as to continue its circuit or course, said rail is drawn downwardly by the operation of the lever K', it being noticed that said rail is somewhat elastic in its nature, so as to be deflected downwardly, and the end of the same slides on the bar F', bringing the beveled upper face of said end sufficiently below the roller C' to permit the latter to ride freely over the rail without causing the brake to be effective.

Having thus described my invention, what I claim as new, and desire to secure by Letters Patent, is—

1. A bicycle attachment comprising rollers journaled in supports secured to and extended above and below the bicycle-frame said rollers being adapted to contact with guides above and below the bicycle.

2. In a pleasure-railway, the combination with an overhead guide, and a bicycle having handle-bars and a seat, of an open frame in which the handle-bars and seat lie and comprising upright rods extending upwardly from the wheels of the bicycle, and a guide-roller at the upper portion of said open frame contacting with said overhead guide.

3. A pleasure-railway comprising an overhead guide, a bicycle having handle-bars and seat, a rod sustained at its lower end by a portion of the bicycle structure below the handle-bars and seat, and having its upper portion in engagement with said overhead guide, said guide and rod being so located in relation to the handle-bar and seat as to offer no obstruction to the occupancy of the seat and use of the handle-bars.

4. A bicycle having a fork with an upwardly-projecting rod and a forwardly-projecting arm, said rod and arm being respectively above and below the reach of the frame, each having a pilot-wheel thereon, substantially as described.

5. A bicycle having rods rising from the bearings of its front and rear wheels, rollers on said rods embracing an elevated track, and a cross-bar connecting said rods, said parts being combined substantially as described.

6. A bicycle having a sleeve rising therefrom, a rod mounted in said sleeve and connected with the fork of the steering-wheel of the bicycle, and a pilot-wheel on the end of said rod, substantially as described.

7. A bicycle having a rod rising therefrom, a vertically-adjustable seat on said rod, and a guide for the upper end of said rod, said parts being combined substantially as described.

8. A bicycle-brake consisting of a shoe with an arm having a roller thereon, an elastic rail pivoted at one end, and loosely supported at the other end, a rocking crank-arm secured to said rail, and a link with a lever connected with said crank-arm, said parts being combined substantially as described.

9. A bicycle provided with an arm having a roller thereon, an inclined auxiliary rail for said roller, pivoted at one end and having its free end loosely resting on a support, and mechanism for raising said free end, the parts named being combined substantially as described.

10. A bicycle having a brake in combination with a rail adapted to be contacted by a portion of said brake and automatically force said brake against a wheel of the bicycle, substantially as described.

EDWARD R. ALLEN.

Witnesses:
JOHN A. WIEDERSHEIM,
WM. C. WIEDERSHEIM.